Figure 2:
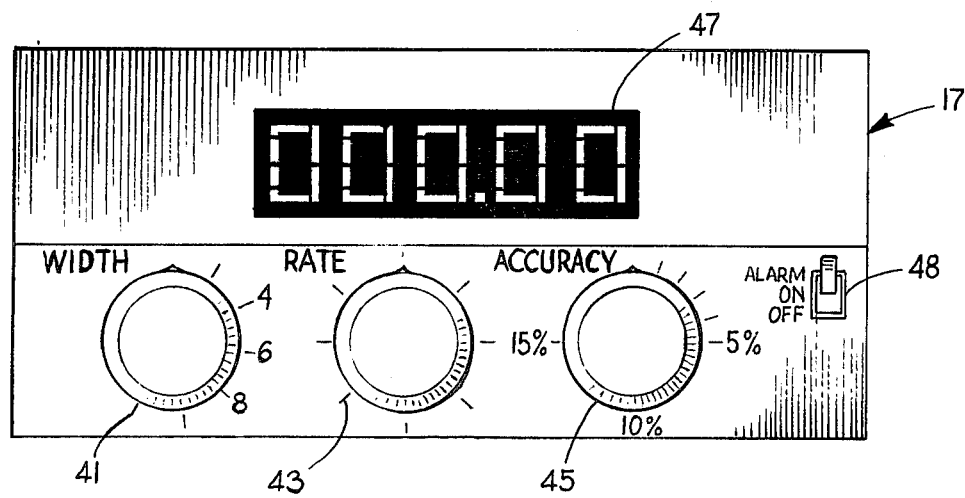

United States Patent [19]

Kays

[11] 4,220,998
[45] Sep. 2, 1980

[54] ELECTRONIC LIQUID APPLICATION RATE MONITORING SYSTEM

[76] Inventor: Sandra E. Kays, 515 Milledge Heights, Athens, Ga. 30606

[21] Appl. No.: 899,167

[22] Filed: Apr. 24, 1978

[51] Int. Cl.² ............................................. G05B 12/00
[52] U.S. Cl. ..................... 364/510; 364/424; 239/162; 239/172
[58] Field of Search ............... 364/510; 239/1, 155, 239/162, 156, 159, 172; 222/614, 52

[56] References Cited

U.S. PATENT DOCUMENTS

| | | | |
|---|---|---|---|
| 3,711,689 | 1/1973 | Park | 364/510 |
| 4,023,020 | 5/1977 | Lestradet | 364/424 X |
| 4,052,003 | 10/1977 | Steffen | 364/510 X |

*Primary Examiner*—Edward J. Wise
*Attorney, Agent, or Firm*—Robert R. Keegan

[57] ABSTRACT

There is disclosed a monitoring system for monitoring the rate at which a liquid such as fertilizer or insecticide or herbicide is dispensed by spraying from a moving vehicle. The system determines and displays an indication of the application rate in gallons per acre or liters per hectare using straightforward computations from inputs representing the outputs of sensors for vehicle velocity, width of spray pattern, and liquid flow rate. Visual and/or audible indicators are also provided to warn the operator when the actual application rate differs from the desired application rate by more than a predetermined permissable error factor.

10 Claims, 3 Drawing Figures

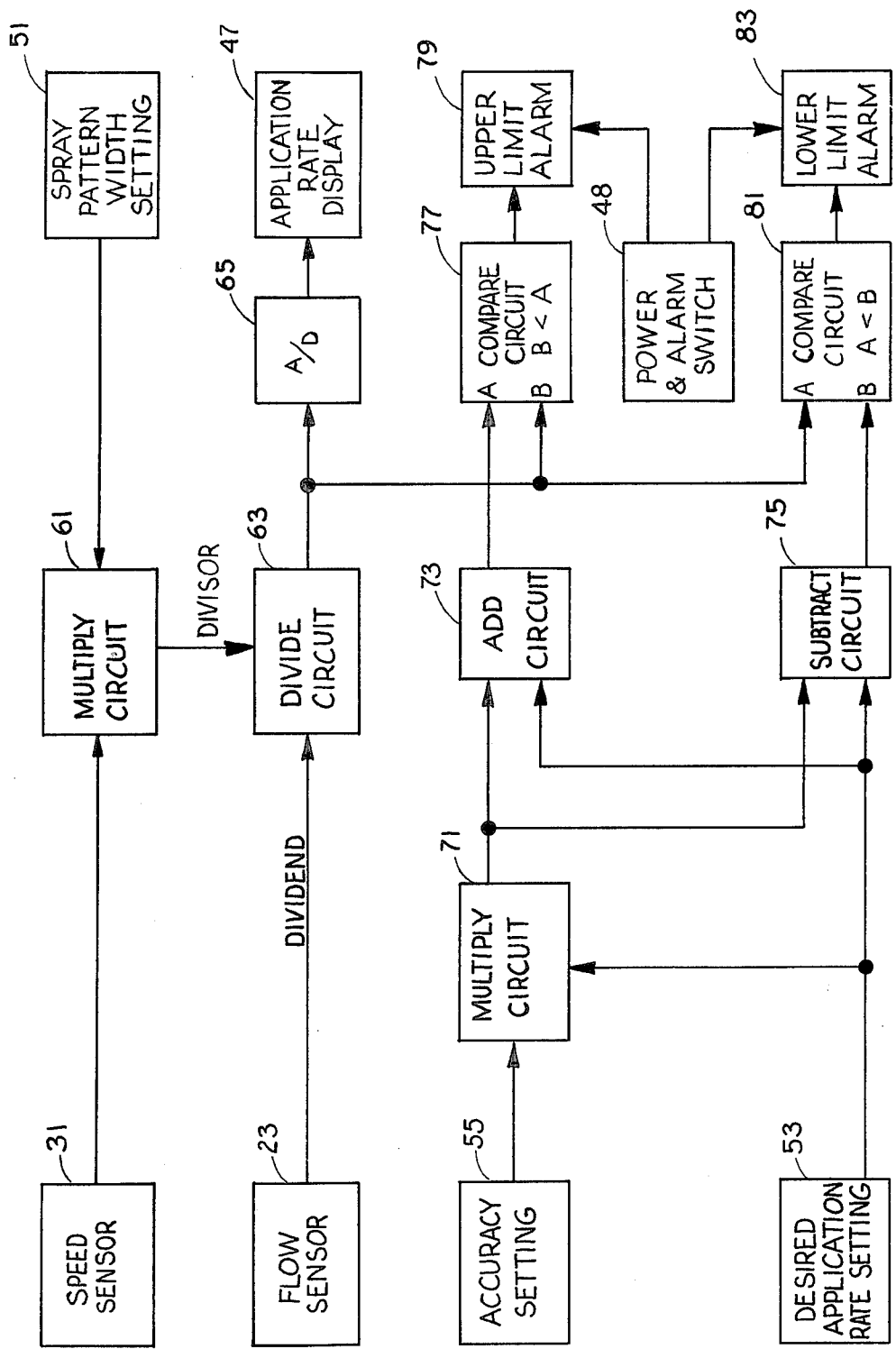

ELECTRONIC LIQUID APPLICATION RATE MONITORING SYSTEM

The present invention relates to apparatus for monitoring the application rate of liquids used in agricultural or horticultural projects. With increasing concern about the ecological effects of chemicals such as fungicides, herbicides, insecticides, nematicides, liquid fertilizers, common growth regulators, etc., used in agriculture, there is an increase in the already existing need for apparatus to aid in the precision application of such liquids without requiring a high degree of skill or training for the operator. There are numerous reasons to avoid overapplication of such liquids, including simple economics, danger of damage to the field crop, and adverse ecological effects. It is obviously also necessary to assure that an adequate application rate is achieved so that the desired effect of the applied liquid will be accomplished and unnecessary repetition will be avoided.

Previous apparatus is known which seeks by electrical or electro-mechanical means to aid in the proper application of liquids from sprayers or the like mounted on a vehicle such as a tractor; such apparatus is shown for example, in U.S. Pat. No. 3,693,838 to Edwin J. Haker et al. Previous apparatus has, however, been less than fully effective, difficult of operation by a typical farm vehicle operator, and not flexible in terms of adaptability to different spray pattern widths, et cetera.

The following patents are representative of prior apparatus for controlling or measuring the operation of vehicle-mounted spray apparatus.

E. J. Haker et al. U.S. Pat. No. 3,693,838 Sept. 22, 1972
J. Goffin U.S. Pat. No. 3,459,375 Aug. 5, 1969
F. F. Oligschlaeges U.S. Pat. No. 3,877,645 Apr. 15, 1975
B. A. Wilder et al. U.S. Pat. No. 3,444,993 Oct. 3, 1967
D. L. Maytum et al. U.S. Pat. No. 3,481,540 Dec. 2, 1969
P. J. A. de Kinkelder U.S. Pat. No. 3,707,305 Dec. 26, 1972
A. A. Ross U.S. Pat. No. 3,587,971 Jun. 28, 1971
D. F. Halberg U.S. Pat. No. 3,233,832 Feb. 8, 1966

The apparatus according to the present invention is utilized in conjunction with an agricultural liquid application system typically consisting of a liquid tank, a pump, and a plurality of spray heads or sub-surface applicators (ground knives) mounted along a support structure extending transversely to the path of the tractor. The apparatus may also be used in association with air-blast sprayers where the spray pattern is determined by the air velocity and direction (such as used for orchards).

The monitoring apparatus includes a flow meter which may be connected into the liquid conduit from the pump to the spray heads or other applicators. It also includes a ground speed sensing apparatus consisting of a wheel and rotational sensor with the wheel either in contact with the ground or with one of the tractor wheels so that its rotation is a direct measurable representation of the vehicle ground speed.

The apparatus also includes a dial for setting in the width of the spray pattern. This permits the spray pattern width to be changed as desired by adjustment of the spray mechanisms and by resetting the spray pattern width dial. With a boom type sprayer it is the number of nozzles, width on the boom, height from the ground, type of nozzle, etc. which determines width. With the air blast it is the air velocity and angle of air movement that determines spray pattern. The apparatus will give an accurate measurement of the liquid application rate for the reduced spray pattern width. The apparatus also includes a display within the view of the vehicle operator which gives a continuous rapid sequential readout of the application flow rate which is calculated by conventional formulae from the pattern width, the liquid flow rate, and the vehicle velocity.

According to the invention, there may also be provided an application setting and audible and/or visual indicator for alerting the operator to any deviation beyond a pre-set percentage from the desired application rate.

The simplicity of this system with a clear visible, preferably digital, readout and secondary protection of an automatic alarm allows the precision application of liquids by operators of moderate skill and training who would not be able to make the necessary calculations and do the required calibrations to attain comparable accuracy by older methods and apparatus. In addition to warning the operator of improper application rate due to improper ground speed, warning will also be given of other common causes of improper application such as an empty or near empty tank, a broken or pinched liquid conduit, et cetera.

In addition to providing the above-described features and advantages, it is an object of the present invention to provided apparatus for monitoring the application of liquids sprayed from a moving ground vehicle which provides a visual indication of the actual application rate at any moment calculated from the spray pattern width, the vehicle velocity, and the liquid flow rate.

It is another object of the present invention to provide such apparatus in which the visual indication of the measured and calculated application rate is supplemented by an alarm system for indicating to the vehicle operator when the application rate departs by greater than a pre-determined percentage from the desired application rate set into the apparatus.

It is still another object of the present invention to provide an application rate monitoring system for liquid sprayed from ground vehicles wherein the width of the spray pattern is adjustable, and the operative spray pattern width may be set into the apparatus by a control dial, thus permitting the apparatus to be utilized with different widths of spray patterns.

Other objects and advantages of the present invention will be apparent from consideration of the following description in conjunction with the appended drawings in which:

FIG. 1 is a rear elevational view of tractor mounted spray apparatus to which the monitoring apparatus of the present invention has been added;

FIG. 2 is an elevational view of the control and display panel for the apparatus according to the present invention; and FIG. 3 is a schematic block diagram of the electro-mechanical and electronic sensors and circuits which carry out the computations necessary in measuring, calculating, and displaying the information in the operation of the monitoring system.

Referring now to the drawings and particularly to FIG. 1, a tractor 11 is shown fitted out for spraying herbicides, pesticides, or the like. In front of an operator's seat 13 is a conventional steering wheel 15, near which is a control and indicator panel 17 forming part of the apparatus according to the present invention.

Tractor 11 is fitted with a tank 19 for the liquid to be sprayed in conventional manner, and a liquid conduit 21 from the tank or from a pump (not shown) connects to the manifold 25 for the spray nozzles 27. According to the present invention, a flow meter 23 is inserted in the liquid conduit 21 and provides an electrical output proportional to the volumetric rate of flow through the conduit 21.

Figure 1:
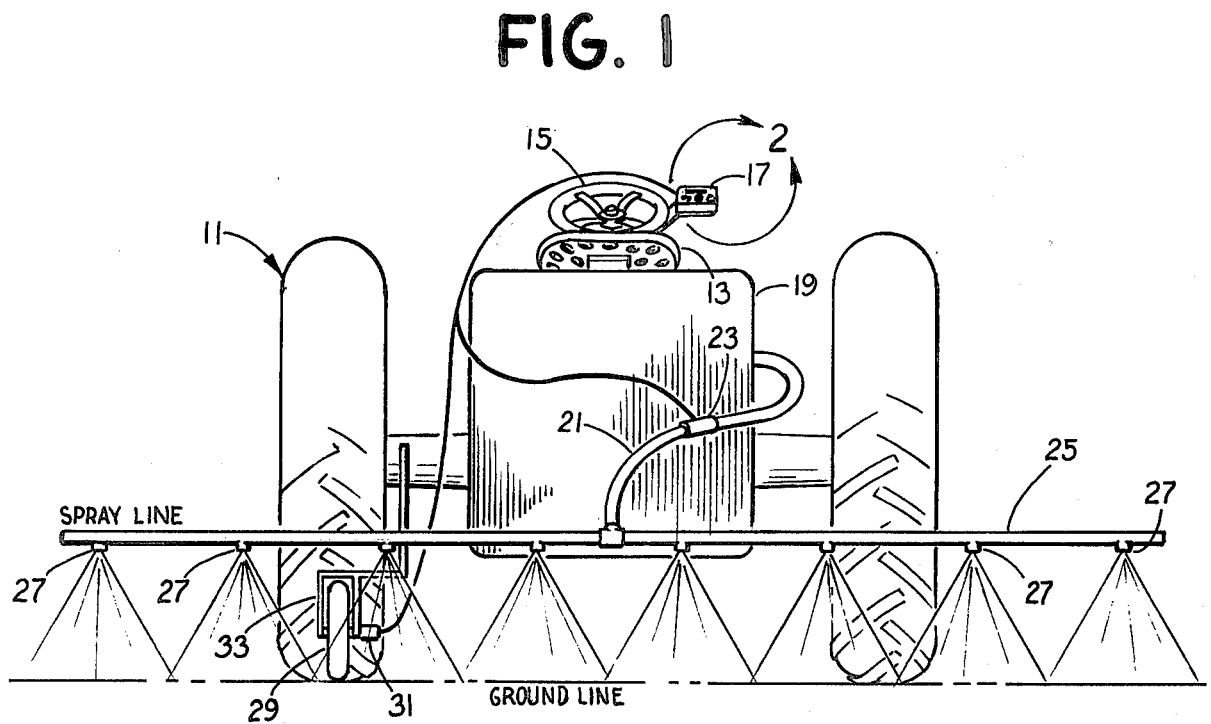

For providing a measurement of vehicle velocity, a fifth wheel 29 is mounted by a bracket 33 to the tractor at any convenient location, as behind one of the main wheels as shown in FIG. 1. A DC generator 31 driven by the wheel 29 provides an output signal proportional in magnitude to the velocity of the vehicle, which, along with the signal from the flow meter, is conveyed by electrical cable to the control and indicator panel 17. Other rotational velocity sensors such as mechanical or optical pulse generators or the like can be utilized in place of the DC generator 31.

The face of the control and indicator panel 17 includes a digital display 47, which, by way of example, is shown with a five digit capacity. Greater or lesser numbers or digits may be provided in the display 47. While a digital display of the LED or LCD type is preferred for the indicator and control unit 17, a conventional analog indicator such as a calibrated galvanometer or the like could be used alternatively.

The electrical requirements of the control and indicator unit 17 including the display and the electronic circuitry are not great and may be supplied either from the 12-volt DC electric supply of the tractor or from self-contained batteries of 9 or 12 volts or both.

The control and indicator unit 17 includes three control dials 41, 43, and 45. Dial 41 is used for setting the spray widths or the width covered by the applicator apparatus. Control dial 43 is for setting the desired application rate, and control dial 45 is for the accuracy setting, which together with the desired application rate setting will set the limits for the auditory alarm system. A three position switch 48 is also provided on the control and indicator unit 17. The switch positions are "off", "on" without auditory alarm and "alarm on".

The electronic circuitry for making the computations for the monitoring system are shown in the schematic block diagram of FIG. 3. It may conveniently be located inside the control and indicator unit 17.

A spray pattern width setting signal source is shown at 51 which may, be way of example, be a variable resistor or potentiometer coupled to control dial 41. The spray pattern width setting signal is transmitted to a multiply circuit 61. The DC generator 31 performs a function of the speed sensor in the circuit of FIG. 3 and also provides a signal representative of the vehicle speed to the multiply circuit 61. As will readily be understood, the output of the multiply circuit 61 is a signal representative of the area per unit time being covered by the spray apparatus. It is supplied to the divisor input of a divide circuit 63. The divide circuit 63 has a dividend input connected to receive the output of flow meter 23 acting as the flow sensor in FIG. 3. In the specific example of FIG. 3, the flow meter is a DC signal producing instrument having an output proportional to the rate of flow.

The output of the divide circuit 63 is a signal representative of the quotient of the two input signals and thus will be understood to represent the application rate in dimensions of volume per unit area. Either the multiply circuit 61 or the divide circuit 63 or both may be calibrated to provide an output in gallons per acre or liters per hectare or any other suitable units.

An output from the divide circuit 63 is transmitted to an analog/digital converter 65 which in turn provides a digital signal to the application rate display 47.

The analog/digital converter 65 is required in order to present the preferred digital form of display in the display element 47, whereas the sensing and computation in the illustrated embodiment is performed with analog signals. It will be understood throughout the explanation that the apparatus for performing analog computations as shown in FIG. 3 may readily be replaced in whole or in part by electronic circuitry for performing digital computations, either special purpose or general purpose in form. Furthermore, the sensors such as 31 and 23 may be pulse emitting sensors provided with frequency/voltage converters to provide analog signals or analog/digital converters may be provided for analog output sensors. The signal sources 51, 53, and 55 may be digital signal sources and the computation circuits digital so that the entire circuitry of FIG. 3 may if desired be instrumented with digital devices. On the other hand, the circuitry may be partially digital and partially analog with appropriate conversions from one to the other.

An accuracy setting signal source 55 is provided which is controlled from control dial 45. The accuracy setting signal source 55 provides a signal to a multiply circuit 71. The multiply circuit 71 also received an input signal from the desired application rate setting signal source 53 which is controlled by the control dial 43. Control dials 41, 43, and 45 may be of any desired type such as rotatable knobs (as shown), thumbwheel switches, et cetera.

The accuracy setting signal source may be calibrated on dial 45 in terms of percentages such as 5, 10, 15 and 20 percent, so that the output of the multiply circuit 71 is a prescribed percentage of the desired application rate setting, and represents the tolerable error in application rate. The output of multiply circuit 71 is provided both to an add circuit 73 and a subtract circuit 75. In the latter case, it is provided as the subtrahend.

Both the add circuit 73 and the subtract circuit 75 are also provided with an output directly from the desired application rate setting signal source 53, and in the case of the subtract circuit, it is provided as the minuend. Accordingly, the add circuit 73 produces an output which is an analog of the upper limit of application rate which is permissable in accordance with the settings of the desired application rate and the accuracy setting, while the subtract circuit 75 provides an analog signal corresponding to the minimum limit of the range of permissable application rates. A comparison circuit 77 receives the signal from add circuit 73 and from the divide circuit 63 (which produces the actual current application rate). In the event that the current application rate exceeds the maximum permissable rate, this is detected by the compare circuit 77, and its output signal energizes the upper limit alarm 79.

In a similar fashion a compare circuit 81 accepts the signal from the subtract circuit 75 and another signal from the divide circuit 63 and generates an output signal in the event that the application rate as computed at the divider circuit 63 is less than the minimum acceptable application rate as represented by the output of the subtract circuit 75. Thus the compare circuit 81 detects an insufficiency of the application rate as computed by the divide circuit 73 and produces an output which activates the lower limit alarm 83.

Preferably, the upper limit alarm 79 and the lower limit alarm 83 will produce different audible signals such as high and low pitch buzzers or a buzzer and a bell so that the operator will not need to refer to the display 47 to determine whether the application rate is excessive or inadequate. One of the two buzzers could be dispensed with and a signal buzzer utilized, if desired.

In operation, the application rate monitoring system would be set up in advance with the spray pattern width set in to control dial 41, the desired application rate set in to control dial 43, and the accuracy desired to be maintained as a percentage figure set into dial 45. With all other preparations made necessary to commence the spraying operation, the operator would start the vehicle, turn on the spray apparatus, and turn on the application rate monitoring system. If the vehicle had not yet obtained the speed necessary to achieve the proper application rate, the upper limit alarm would commence when the monitoring system was turned on. At the same time, the display 47 would show the application rate prevailing at the time and the operator could determine that it was high and by what amount.

Upon determining that the application rate was too great, the operator would speed the tractor until the proper rate had been determined as evidenced by the discontinuance of the upper limit alarm and the display 47.

If the vehicle speed was not maintained or the rate of flow to the sprayers 27 changed or if for any other reason the application rate increased or decreased, this would be indicated on the display 47, and if the magnitude of change was sufficiently great, it would also be indicated by activation of the upper limit alarm 79 or the lower limit alarm 83.

It may be noted that the operator may have within his control the volume of liquid which is being supplied to the sprayers 27 and may, if he desires, maintain the vehicle speed the same and control the volume of spray in order to achieve the desired rate of application, or he may both change the vehicle speed and also change the rate of flow to the sprayers. No matter what combination of variables the operator might change, the computation of the application rate remains valid and is a reliable indication to the operator that the proper application rate is being achieved. In general, it is less desirable to change flow rate as this may adversely affect operation of the nozzles and cause non-uniform distribution by the spray apparatus.

As previously mentioned, the monitoring system according to the present invention is subject to numerous variations and modifications. In particular, the electronic control circuit which has been specifically illustrated in FIG. 3 as utilizing analog computer circuit elements may be instead implemented with entirely digital electronic computer elements or with a combination of the two types in a hybrid circuit. Similarly, the sensors and the control dials may be of the analog type as specifically illustrated or may be digital type elements. On the other hand, the application rate display which is the only digital element specifically illustrated in FIGS. 2 and 3 may instead be an analog type indicator such as a conventional meter, if desired.

While the system specifically described will be appropriate and more than adequate in most situations, it may in some cases be desired to replace or supplement the display 47 with a recording device such as a chart recorder or magnetic tape recorder. This is a readily achieved modification of the system as a chart recorder can readily be arranged with the chart paper driven at a speed determined by the output from the speed sensor 31 while the chart pen or other marker is deflected or controlled by the output of the divide circuit 63 which is representative of the application rate. Thus a permanent record of the accuracy with which the liquid spray was supplied to the field crop or other area would be provided.

The specific illustration contemplates the use of audible alarms, but these may readily be replaced or supplemented with visible indicators for warning of improper application rates such as steady or flashing electric lamp indicators or the like. While the apparatus is illustrated as mounted on a self-propelled vehicle (tractor), in some cases it may be desired to utilize a special purpose liquid applicator vehicle which may be self-propelled or pulled by a tractor power vehicle.

From the foregoing description and explanation, it will be seen that the liquid application rate monitoring system according to the present invention provides a simple and reliable, but highly effective, system for enabling a relatively untrained and unskilled vehicle operator to accomplish an agricultural spraying operation with herbicides, fungicides, pesticides, or the like with a high degree of uniformity and accuracy in the application rate. Notwithstanding the advantages provided by the monitoring system, it is relatively uncomplicated and inexpensive and readily incorporated in existing or specially designed spraying apparatus.

In addition to the variations and modifications of the invention described or suggested above, numerous other modifications and variations will be apparent to those skilled in the art, and, accordingly, the scope of the invention is not to be deemed to be limited to those specific embodiments illustrated, described, or suggested, but is rather to be determined by reference to the appended claims.

What is claimed is:

1. In mobile liquid application apparatus including a vehicle, multiple liquid applicators mounted thereto and a liquid conduit supplying liquid to said applicators; apparatus for monitoring the application rate per unit area of a liquid sprayed by said equipment comprising
   a flow meter for generating a signal representative of the volumetric flow rate of liquid in said liquid conduit,
   a speedometer for generating a signal representative of the speed of said vehicle,
   an adjustable pattern width signal generator for generating a signal representative of the width of pattern produced by said applicators,
   means for producing from the above said signals a single signal representative of the liquid flow rate divided by the product of the vehicle speed and the spray pattern width setting,
   means for indicating the value of the last said single signal,
   an adjustable desired application rate signal generator for generating a signal representative of the desired application rate,
   an adjustable application rate accuracy signal generator for generating a signal representative of the application rate accuracy,
   and means for generating from said desired application rate signal and application rate accuracy signal an upper rate limit signal and a lower rate limit signal, for comparing said single signal with said upper rate limit signal and said lower rate limit signal and for generating an operator-discernible signal when said single signal is outside the limits of said lower limit application rate signal and said upper limit application rate signal.

2. Apparatus as claimed in claim 1 wherein said means for generating an upper rate limit signal and a lower rate limit signal includes means for producing a signal representative of the product of said application rate accuracy signal and said desired application rate signal and for adding and substracting the last said product signal from said desired application rate signal.

3. In mobile liquid application equipment including a vehicle, multiple liquid applicators mounted thereto and a liquid conduit supplying liquid to said applicators; apparatus for monitoring the application rate per unit area of a liquid sprayed by said equipment comprising
   a flow meter for generating a signal representative of the volumetric flow rate of liquid in said liquid conduit,
   a speedometer for generating a signal representative of the speed of said vehicle,
   an adjustable pattern width signal generator for generating a signal representative of the width of pattern produced by said applicators,
   means for producing from the above said signals a single signal representative of the liquid flow rate divided by the product of the vehicle speed and the spray pattern width setting,
   and means for indicating the value of the last said single signal.

4. Apparatus as claimed in claim 3 wherein the means for indicating the value of the last said single signal includes a multi-digit digital display.

5. Apparatus as claimed in claim 3 or 4 further including means for producing a warning signal when said single signal exceeds a predetermined value.

6. Apparatus as claimed in claim 3 further including means for producing a warning signal when said single signal is less than a predetermined value.

7. Apparatus as claimed in claim 3 wherein said speedometer includes a wheel mounted on said vehicle in contact with the ground surface and means for generating a signal corresponding to the rotational velocity of said wheel.

8. Apparatus as claimed in claim 5 further including means for producing a warning signal when said single signal is less than a predetermined value.

9. Apparatus as claimed in claim 3 further including an adjustable desired application rate signal generator for generating a signal representative of the desired application rate, an adjustable application rate accuracy signal generator for generating a signal representative of the application rate accuracy, and means for generating from said desired application rate signal and application rate accuracy signal, an upper rate limit signal and for comparing said single signal with said upper rate limit signal and for generating an operator-discernable signal when said single signal is greater than said upper limit application rate signal.

10. Apparatus as claimed in claim 9 further including means for generating from said desired application rate signal and application rate accuracy signal a lower rate limit signal, for comparing said single signal with said lower rate limit signal, and for generating an operator-discernable signal when said single signal is less than said lower limit application rate signal.

* * * * *